United States Patent [19]
Boretti

[11] 3,745,888
[45] July 17, 1973

[54] FLUID OPERATED LINEAR MOTOR
[75] Inventor: Napoleon P. Boretti, Bloomfield Hills, Mich.
[73] Assignee: General Motors Corporation, Detroit, Mich.
[22] Filed: Nov. 24, 1971
[21] Appl. No.: 201,816

[52] U.S. Cl............................ 92/9, 92/137, 92/255
[51] Int. Cl. ........ F15b 15/22, F01b 9/00, F16j 1/00
[58] Field of Search ..................... 92/9, 137; 91/186

[56] References Cited
UNITED STATES PATENTS

| | | | |
|---|---|---|---|
| 640,242 | 1/1900 | Turner et al.............................. | 92/9 |
| 2,740,610 | 4/1956 | Gatti...................................... | 92/137 |
| 3,121,371 | 2/1964 | Graham ................................ | 92/137 |
| 3,667,552 | 9/1972 | Gordon................................. | 92/137 |

FOREIGN PATENTS OR APPLICATIONS

| | | | |
|---|---|---|---|
| 722,228 | 12/1931 | France................................ | 92/137 |

*Primary Examiner*—Paul E. Maslousky
*Attorney*—W. E. Finken and Herbert Furman

[57] ABSTRACT

A fluid operated linear motor includes an elongated container member defining an elongated cylindrical cavity that receives a piston mounted for reciprocal movement in sealing engagement with the container member. A pair of cables have respective first ends secured to opposite ends of the piston and extend through apertures adjacent the ends of the cavity. Washer seals are received within the apertures in engagement with the cables to seal the ends of the cavity. End plugs are selectively held in the ends of the apertures to maintain the seals in position. A pair of springs move the seals out of the apertures where they are readily accessible for replacement upon removal of the end plugs. The cables extend outwardly from the apertures over a pair of pulleys respectively mounted on a pair of arms that are selectively pivotable to positions locating the pulleys away from the apertures to further facilitate seal accessibility during replacement. The other ends of the cables are respectively secured to rods of a pair of pistons received within an oil filled cylindrical member of a slack take-up mechanism while in an alternate embodiment the cylindrical member defines a pair of cavities respectively receiving the pistons. A pair of springs extending between the pistons and the cylindrical member bias the pistons toward each other to absorb slack in the cables, while check valve assemblies allow oil flow through the pistons during slack absorbing movement but prevent oil flow in the opposite direction and movement of the pistons away from each other.

7 Claims, 8 Drawing Figures

INVENTOR.
Napoleon P. Boretti
BY
Herbert Furman
ATTORNEY

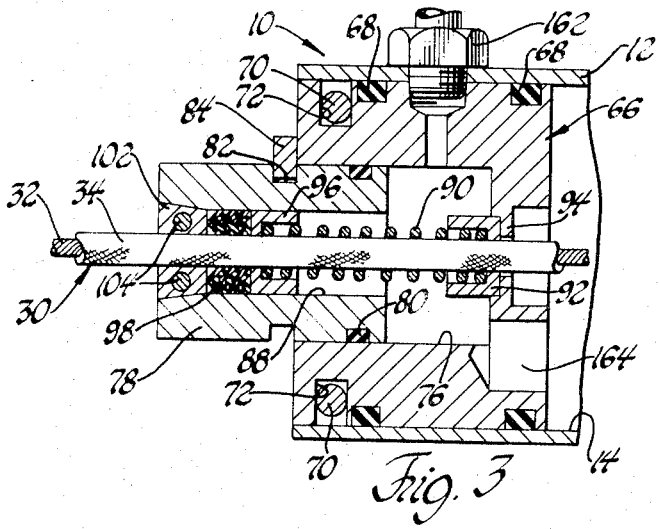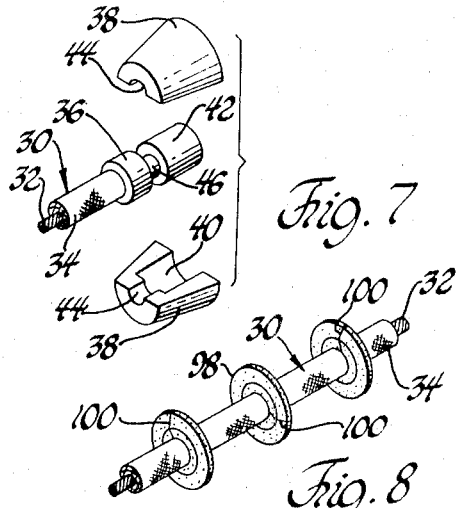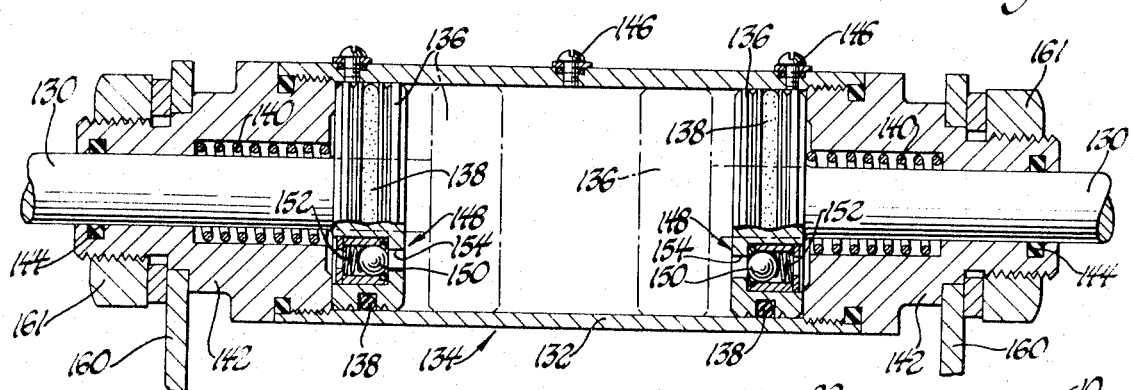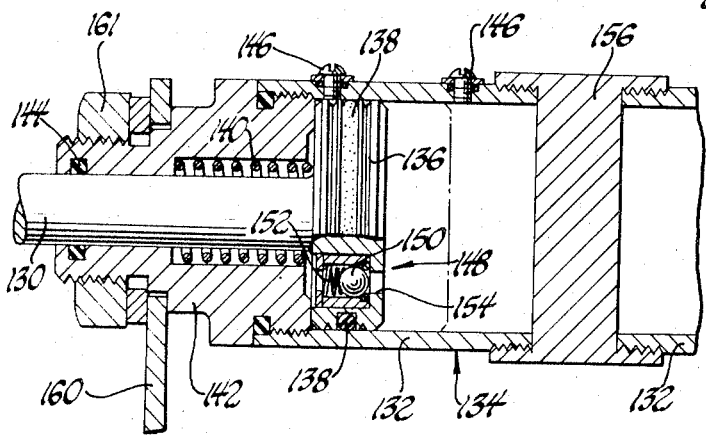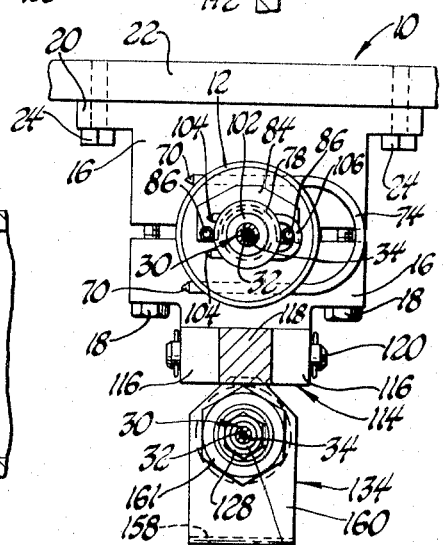

3,745,888

FLUID OPERATED LINEAR MOTOR

BACKGROUND OF THE INVENTION

This invention relates generally to a fluid operated linear motor having a cable with end portions attached to opposite ends of a piston which reciprocates in a cylindrical cavity in response to a differential fluid pressure applied to the ends of the piston such that a closed loop defined by the cable reciprocates in a corresponding manner and is adaptable by a suitable connection to supply desired reciprocal movement.

Fluid operated linear motors have many applications where reciprocal movement is required. Moving sliding doors between open and closed positions, moving squeegees during silk screening processes, transferring work pieces between different stages of manufacturing operations, and moving the heads of drill presses between raised and lowered positions are some of these applications. These motors generally include a container member defining a cylindrical cavity that receives a piston reciprocably movable in response to a differential fluid pressure applied to the opposite ends of the piston. A cable having ends attached to the opposite ends of the piston extends out of the cavity through apertures in the opposite ends of the container member and over pulleys to form a closed loop that reciprocates with the piston. While the portion of the cable extending between the pulleys outside of the container member generally has a rectilinear configuration, it is also possible for this cable portion to pass over a third pulley to provide alternating rotatable movement to this additional pulley. The pressure or the vacuum supplied to the cavity to reciprocate the piston necessitates cable seals at the container member apertures that slidably receive the cable. These seals must occasionally be replaced since the sliding of the cable necessarily causes seal wear. However, these seals are somewhat inaccessible since the pulleys are positioned relatively close to the apertures to prevent misalignment of the cable and seals and consequent excessive seal wear. Slackening of the cable during operation of the motor also affects the cable and seal alignment and results in seal wear. The cable slackening may also result in the cable dragging along the floor or ground adjacent the motor during reciprocation of the piston and cause cable wear.

SUMMARY OF THE INVENTION

This invention provides an improved fluid operated linear motor of the type described which is capable of absorbing cable slack and has cable seals that are readily accessible for replacement.

In the preferred embodiments of fluid operated linear motors according to the invention, respective first ends of a pair of cables are attached to the piston within the cavity defined by the container member and extend outwardly through apertured closure members at the ends of the cavity. Split washer seals are stacked with their slits circumferentially spaced and engage the cables within the closure member apertures to seal the ends of the cavity. A pair of end plugs are respectively fitted within the ends of the apertures to maintain the seals in position. Removal of the plugs allows a pair of springs to move the seals out of the apertures where they are readily accessible for replacement. A pair of pulleys respectively receive the cables adjacent the ends of the container member and are respectively mounted by a pair of arms for selective pivotal movement to an out-of-the-way position to further facilitate seal accessibility during replacement. The cables extend between the pulleys and have their respective second ends secured to a pair of rods attached to pistons received within a cylindrical member of a take-up mechanism. In one embodiment the cylindrical member of the take-up mechanism defines a single oil-filled cavity in which a pair of springs bias the pistons toward each other to absorb slack in the cables, while check valve assemblies allow oil flow through the pistons during the slack absorbing movement but prevent oil flow in the opposite direction and movement of the pistons away from each other. In another embodiment the take-up mechanism operates in a similar manner but the cylindrical member defines a pair of cavities that respectively receive the pistons.

Accordingly, one feature of this invention is that it provides an improved fluid operated linear motor generally of the type described in which replacement of the cable seals is facilitated by providing the cable pulleys for movement between a position adjacent the seals and an out-of-the-way position. Another feature of the invention is that the seals are normally biased outwardly of the motor cavity to allow seal movement to an accessible position during replacement. Another feature of the invention is that it provides a take-up mechanism for absorbing slack in the cable of the linear motor. Another feature of the invention is that the take-up mechanism includes a spring biased piston received within an oil-filled cavity and having a check valve assembly that allows oil flow and piston movement providing the slack absorption while preventing reverse oil flow and piston movement.

BRIEF DESCRIPTION OF THE DRAWINGS

An understanding of the present invention is readily apparent from the following description of the preferred embodiments and the drawings in which:

FIG. 3 is an enlarged view of a portion of FIG. 2 showing one end of the container member and seals that engage the cable to seal that end of the container member;

FIG. 4 is an enlarged sectional view of the take-up mechanism;

FIG. 5 is an end view of the linear motor taken generally along line 5—5 of FIG. 2;

FIG. 6 is a sectional view of another embodiment of the take-up mechanism for absorbing cable slack;

FIG. 7 is an enlarged exploded view of one cable end and a pair of tapered locking members for securing the cable to the piston within the cavity of the container member as shown in FIG. 2; and FIG. 8 is an enlarged view of the cable and seals showing the manner in which the slits of the seals are circumferentially spaced prior to being stacked in the assembled position shown in FIGS. 2 and 3.

DESCRIPTION OF THE PREFERRED EMBODIMENTS

Figure 1:
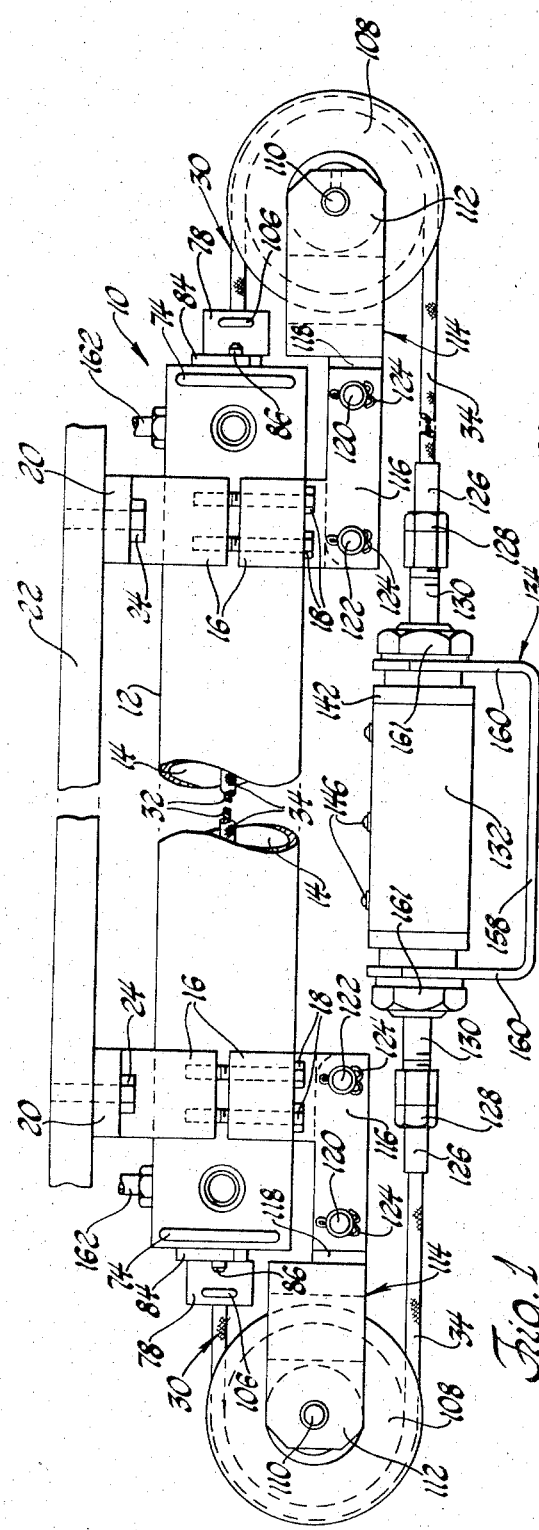
FIG. 1 is a partially broken away side view of a fluid operated linear motor according to this invention and a take-up mechanism for absorbing cable slack.
Figure 2:
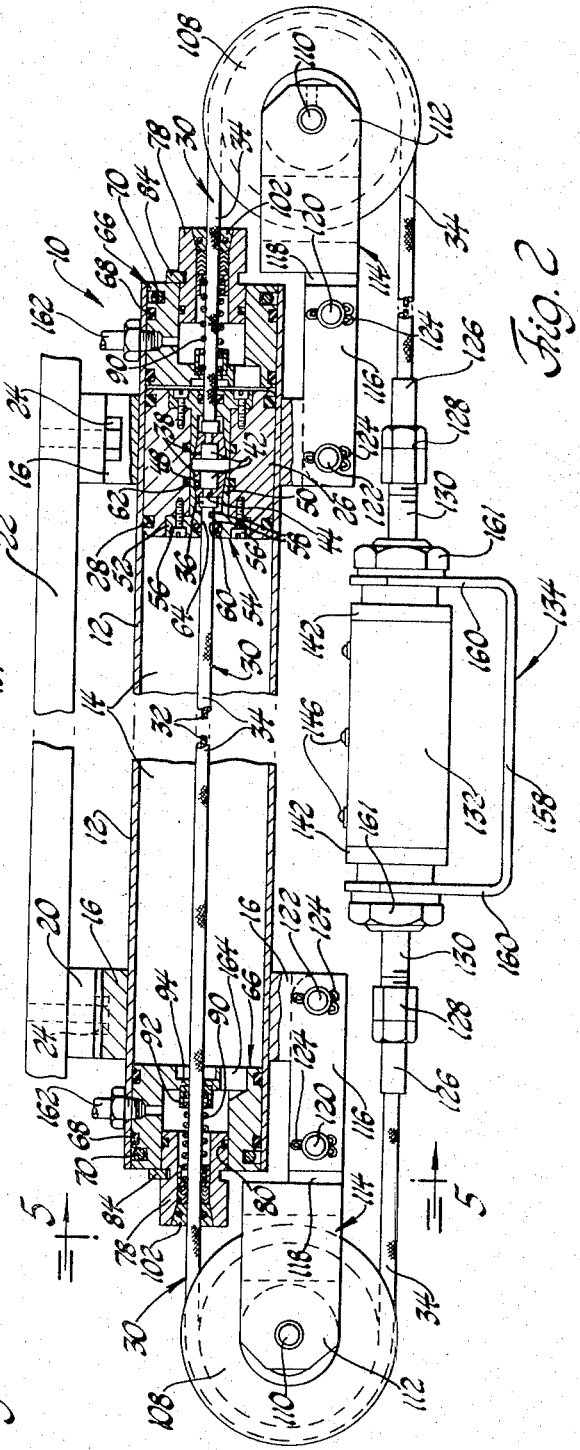
FIG. 2 is a view similar to FIG. 1 but showing the container member of the motor in section.

Referring to FIGS. 1 and 2 of the drawings, a fluid operated linear motor, according to this invention, is generally indicated by 10 and includes an elongated cylindrical container member 12 defining an elongated cylindrical cavity 14. Generally adjacent the opposite ends of the container member 12, respective pairs of attachment members 16 encircle the container member, see also FIG. 5, and are held in position relative to each other by bolts 18. Flanges 20 of the upper attachment members 16 are secured to a suitable support 22 by bolts 24 to position the container member 12 relative to the support. As seen in FIG. 2, a piston 26 is reciprocally movable between the opposite ends of container member 12 within cavity 14, while conventional annular piston seals 28 provide sealing engagement between the piston and the inner container member wall defining the cavity during such movement.

A pair of cables generally indicated by 30 include suitable wound wire strands 32 covered by gas impervious cloth 34. The cables 30 have first ends received within the cavity 14 and terminating in end fittings 36, see also FIG. 7, suitably attached to the wire strands 32 of the cables. Pairs of attachment members 38 include grooves 40 receiving the terminal ends 42 of end fittings 36 and include flange portions 44 received within grooves 46 in the end fittings to axially fix the attachment members 38 relative to the cables. The outer walls of the attachment members 38 taper outwardly toward their ends and, as seen in FIG. 2, seat against similarly tapered walls 48 of annular flange portions 50 extending from the heads 52 of attachment members generally indicated by 54. The heads 52 are recessed flush with the end faces of piston 26 as are attachment bolts 56 such that they do not limit the length of reciprocal piston movement adjacent the ends of the cavity 14. The attachment members 54 include annular ribs 58 between which are received annular seals 60 that engage the outer cloth 34 of the cables. The piston 26 includes grooves that receive seals 62 engaging the outer wall of flange portions 50. Seals 60 and 62 cooperatively seal the cavities 64 that receive the junctures between the end fittings 36 and the ends of the cloth 34. Consequently, when the cavity 14 of container member 12 is pressurized on one side of piston 26 to provide a differential fluid pressure on the opposite ends of the piston causing piston movement, as will be described, the junctures between the cloth 34 and the end fittings 36 are not pressurized. Were this not the case, the fact that cloth 34 is gas impervious would allow a pressurized gas to move through these junctures and axially along the cables between the cloth and wire strands such that the cloth would tend to separate from the wire strands.

Annular closure members generally indicated by 66, FIGS. 2 and 3, are received within the opposite ends of container member 12 with annular seals 68 sealing against the inner wall of the container member. Generally U-shaped pins include leg portions 70 received within annular grooves 72 in the closure members 66 and extend through suitable apertures in the container member 12 to secure the closure members in position. Respective ends of leg portions 70 are integrally connected by base portions 74 of the pins, FIG. 1, which are readily accessible to allow removal of the pins and closure members for providing access to cavity 14. It is also possible to provide suitable retaining clips, such as cotter pins, extending through the terminal ends of leg portions 70 on the opposite side of container member 12 from the base portions 74 of the pins to selectively retain the pins in position.

The closure members 66 include bores 76, see FIG. 3, slidably receiving respective end members 78 whose outer walls are sealed with the closure member walls defining bores 76 by seals 80. Annular grooves 82 in the end members 78 receive generally U-shaped members 84, see FIG. 5, secured to the closure members 66 by bolts 86 to axially fix the end members relative to the closure members. The end members 78 include axial bores 88 receiving the cables 30 extending outwardly of the opposite ends of the container member 12. Within the respective bores 76 and 78 of the closure members 66 and end members 78, helical springs 90 encircle the cables with their inner ends seating against generally cup-like fittings 92 engaging annular flanges 94 on the inner ends of closure members 66. The outer ends of springs 90 seat against generally cup-like fittings 96 that engage annular split washer seals 98. The slits 100 of seals 98, see FIG. 8, are circumferentially spaced relative to each other before assuming the stacked position of FIGS. 2 and 3 such that no leakage will occur through these seals. End plugs 102 engage the outermost seals 98 and are held in position by generally U-shaped pins including leg portions 104, FIGS. 2 and 3, and base portions 106, FIG. 1. The base portions 106 are accessible to allow removable of the leg portions 104 from the plugs 102 and end members 78 such that the bias of springs 90 moves the fittings 96 and the seals 98 outwardly of the outer ends of end members 78 where the seals are readily accessible for replacement.

A pair of pulleys 108 receive the cables 30 adjacent the opposite ends of container member 12 and are rotatably supported on pins 110 extending between legs 112 of generally fork-like members 114. The lower attachment members 16 positioning container member 12 relative to support 22 include spaced legs 116 extending towards the opposite ends of container member 12 and, as best seen in FIG. 5, handle portions 118 of the generally fork-like members 114 are received between the spaced legs. Pins 120 and 122 retained in position by cotter pins 124 extend through apertures in the spaced legs 116 and the handle portions 118 such that the fork-like members maintain the pulleys 108 in the position of FIGS. 1 and 2 during operation of the linear motor 10. The cotter pins 124 associated with pins 120 are removed to allow removal of pins 120 and downward swinging movement of fork-like members 114 about pins 122. The pulleys 108 swing downwardly with the swinging fork-like members 114 such that the end members 78 at the opposite ends of container member 12 are readily accessible during replacement of the seals 98. Upward swinging movement of the fork-like members 114 and replacement of the pins 120 again positions the pulleys 108 in the assembled position after replacement of the seals.

As seen in FIGS. 1 and 2, between the pulleys 108, the second ends of wire strands 32 of cables 30 are suitably secured to respective ends of a pair of fittings 126. The other ends of fittings 126 are received by respective elongated nuts 128 and include annular flanges, not shown, rotatable within annular grooves in the nuts such that the nuts rotate on but are axially fixed relative to the fittings. The free threaded ends of a pair of connecting rods 130 are respectively received by the nuts 128 to allow initial tensioning of the cables upon assembly of motor 10. The other ends of connecting rods 130 are received within a cylindrical member 132 of a slack take-up mechanism generally indicated by 134.

Referring additionally to FIG. 4 which shows the take-up machanism 134 in section, the connecting rods 130 are integrally connected to respective pistons 136 reciprocably movable within the cylindrical member 132 with conventional annular seals 138 providing sealing engagement with the inner wall of the cylindrical member. A pair of helical springs 140 have their opposite ends seated against pistons 136 and closure members 142 threaded onto the opposite ends of cylindrical member 132. The springs 140 are sufficiently compressed upon assembly to overcome the friction resulting from annular seals 144 engaging the connecting rods 130 and to move the pistons 136 generally toward each other to absorb cable slack as will be described. A screw 146 is removed from the upper side of cylindrical member 132 to allow filling the cylindrical member with a suitable viscous fluid such as oil. Check valve assemblies generally indicated by 148 include balls 150 biased by springs 152 to close ports 154 that communicate the interior portion of cylindrical member 132 on opposite sides of pistons 136. During operation of the linear motor 10, slack that may develop in the cables 30 is absorbed by movement of the pistons 136 toward each other under the bias of springs 140. The springs 152 are compressed as balls 150 unseat and allow oil to flow through ports 154 toward the outer ends of cylindrical member 132 during this slack absorbing piston movement. The check valve assemblies 148 will not allow oil flow in a reverse direction and, consequently, the oil that flows through ports 154 acts on the outer sides of pistons 136 to prevent movement of the pistons away from each other and resultant cable slackening. It is important that the cylindrical member 132 be completely filled with the viscous fluid on both sides of each piston to ensure effective operation of the take-up mechanism.

FIG. 6 shows another embodiment of the slack take-up mechanism 134. While this embodiment is similar to the embodiment shown in FIG. 4, it differs in that the cylindrical member 132 is divided into two portions that are threaded onto opposite ends of a member 156. Consequently, pistons 136 are respectively received within individual cavities and oil leakage from one cavity will not prevent effective cable slack absorbing operation of the piston in the other cavity.

Referring generally to FIGS. 1 and 2 in light of what has been described, a generally U-shaped bracket 158 has apertured leg portions 160 receiving the outer ends of the closure members 142 and secured in the position shown by nuts 161. Bracket 158 allows a connection of linear motor 10 to a mechanism to be reciprocally moved. As seen in FIG. 2, suitable fluid fittings 162 communicate with bores 76 and cavity 14 through passages 164 at the lower ends of bores 76 to the opposite sides of piston 26. The fittings 162 thus allow pressurizing one side of the piston or drawing a vacuum on the opposite side to supply a differential fluid pressure that moves the piston from one end of container member 12 to the other. A reversal of this differential fluid pressure returns the piston to the one end of the container member. As the piston 26 reciprocates, the cables 30 move over pulleys 108 and reciprocate the bracket 158 and the mechanism to which it is connected. Since the pulleys 108 are positioned substantially adjacent end members 78 at the opposite ends of container member 12, alignment is maintained between the cables 30 and seals 98 to prevent excessive seal wear. If the seals 98 become worn due to prolonged use, the pulleys 108 are movable downwardly to allow access to the seals for replacement. If a slack develops in the cables 30, the take-up mechanism 134 will absorb the slack.

It is, of course, understood that any elongated generally flexible member will function in the same manner as the cables 30. Consequently, it is not necessary to use the wound wire strands 32 as disclosed. Likewise it is not necessarily a requirement that the cables be covered with the cloth 34. However, if it is desired to so cover the cables, as it well may be, the junctures of the cables and cloth at their attachment to the piston 26 should be sealed as described.

The invention thus provides an improved fluid operated linear motor.

What is claimed is:

1. A fluid operated linear motor comprising, in combination, container means defining a cylindrical cavity and cable receiving apertures opening to the respective ends of the cavity, piston means reciprocally movable within the cavity in sealing engagement with the container means, cable means extending exteriorly of the container means between the opposite ends thereof and through the cable receiving apertures, attachment means securing the ends of the cable means to the opposite ends of the piston means, sealing means engaging the cable means adjacent the cable receiving apertures to seal the ends of the cavity, first and second rotatable means respective the opposite ends of the container means and having generally annular cable receiving portions, means mounting the first and second rotatable means for bodily shifting movement between first positions where their cable receiving portions are located out of alignment with the outer ends of the cable receiving apertures so that these apertures are readily accessible to facilitate replacement of the sealing means and second positions where the cable receiving portions of the rotatable means are located in proximity to the apertures in alignment therewith so as to receive the cable means such that the cable means forms a closed loop that reciprocates during reciprocation of the piston means, means for selectively maintaining the rotatable means in the second positions, and means adaptable to communicate a differential fluid pressure to the opposite sides of the piston means to reciprocate the piston means and the closed loop formed by the cable means.

2. A fluid operated linear motor comprising, in combination, container means defining a cylindrical cavity and cable receiving apertures opening to the respective ends of the cavity, piston means reciprocally movable within the cavity in sealing engagement with the container means, cable means extending exteriorly of the container means between the opposite ends thereof and through the cable receiving apertures, attachments means securing the ends of the cable means to the opposite ends of the piston means, sealing means engaging the cable means adjacent the cable receiving apertures to seal the ends of the cavity, first and second rotatable means respective the opposite ends of the container means and having generally annular cable receiving portions, first and second arms respectively supporting the first and second rotatable means and pivotably mounted for movement that bodily shifts the rotatable means between first positions where their cable receiving portions are located out of alignment with the outer ends of the cable receiving apertures so that these apertures are readily accessible to facilitate replacement of the sealing means and second positions where the cable receiving portions of the rotatable means are located in proximity to the apertures in alignment therewith so as to receive the cable means such that the cable means forms a closed loop that reciprocates during reciprocation of the piston means, means for selectively maintaining the arms in the second positions, and means adaptable to communicate a differential fluid pressure to the opposite sides of the piston means to reciprocate the piston means and the closed loop formed by the cable means.

3. The fluid operated linear motor of claim 2 in which the sealing means are spring biased outwardly of the cable receiving apertures to further facilitate replacement of the sealing means.

4. The fluid operated linear motor of claim 2 in which the cable means includes a gas impervious covering over wire strands and in which the attachment means seals the end junctures between the covering and the wire strands during pressurization of the cavity to prevent separation of the covering from the wire strands.

5. A fluid operated linear motor comprising, in combination: container means defining a cylindrical cavity and cable receiving apertures opening to the respective ends of the cavity; piston means reciprocally movable within the cavity in sealing engagement with the container means; a pair of cable means with first ends extending through the cable receiving apertures; attachment means securing the first ends of the pair of cable means to the opposite ends of the piston means; sealing means engaging the cable means adjacent the cable receiving apertures to seal the ends of the cavity; first and second rotatable means mounted adjacent the opposite ends of the container means and including portions receiving respective intermediate portions of the pair of cable means; a slack take-up mechanism including first and second members respectively attached to the second ends of the pair of cable means with one of the members movable in a first direction relative to the other member to absorb slack in the cable means, means biasing the one member in the first direction of movement, and means allowing the movement of the one member in the first direction and preventing movement thereof in the opposite direction; and means adaptable to communicate a differential fluid pressure to the opposite sides of the piston means to reciprocate the piston means and the closed loop formed by the first and second cable means.

6. A fluid operated linear motor comprising, in combination: container means defining a cylindrical cavity and cable receiving apertures opening to the respective ends of the cavity; piston means reciprocally movable within the cavity in sealing engagement with the container means; a pair of cable means with first ends extending through the cable receiving apertures; attachment means securing the first ends of the pair of cable means to the opposite ends of the piston means; sealing means engaging the cable means adjacent the cable receiving apertures to seal the ends of the cavity; first and second rotatable means mounted adjacent the opposite ends of the container means and including portions receiving respective intermediate portions of the pair of cable means; a slack takeup mechanism including first and second connecting members having ends respectively attached to the second ends of the pair of cable means, a cylindrical member adaptable to receive a control fluid and receiving the other ends of the connecting members, a pair of piston members respectively attached to the other ends of the connecting members and sealingly slidable within the cylindrical member, means biasing the piston members toward each other to absorb slack in the loop formed by the pair of cable means, and check valve means for allowing fluid flow through the piston members during movement thereof toward each other to absorb the slack while preventing a reverse fluid flow and movement of the piston members away from each other; and means adaptable to communicate a differential fluid pressure to the opposite sides of the piston means to reciprocate the piston means and the closed loop formed by the cable means.

7. The fluid operated linear motor of claim 6 in which the cylindrical member defines a pair of cavities respectively receiving the pair of piston members.

* * * * *